(12) United States Patent
Oh et al.

(10) Patent No.: US 10,424,136 B2
(45) Date of Patent: Sep. 24, 2019

(54) APPARATUS AND METHOD FOR ESTIMATING TORQUE OF ENGINE CLUTCH IN HYBRID ELECTRIC VEHICLE

(71) Applicants: Hyundai Motor Company, Seoul (KR); Kia Motors Corporation, Seoul (KR)

(72) Inventors: Ji Won Oh, Hwaseong-Si (KR); Young Joon Chang, Yongin-Si (KR); Jeong Soo Eo, Hwaseong-Si (KR); Youn Kwang Jung, Suwon-Si (KR); Sung Jae Kim, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/830,899

(22) Filed: Dec. 4, 2017

(65) Prior Publication Data

US 2019/0088044 A1    Mar. 21, 2019

(30) Foreign Application Priority Data

Sep. 20, 2017    (KR) .......................... 10-2017-0121259

(51) Int. Cl.
    *G07C 5/08*    (2006.01)
    *B60K 6/387*    (2007.10)
(52) U.S. Cl.
    CPC ........... *G07C 5/0808* (2013.01); *G07C 5/085* (2013.01); *B60K 6/387* (2013.01); *B60Y 2200/92* (2013.01); *Y10S 903/914* (2013.01)

(58) Field of Classification Search
    CPC ...... G07C 5/0808; G07C 5/085; B60K 6/387; B60Y 2290/92; Y10S 903/914
    USPC ................................... 701/32.9, 54; 477/110
    See application file for complete search history.

(56) References Cited

U.S. PATENT DOCUMENTS

| 2010/0280721 A1* | 11/2010 | Marcigliano ......... B60W 30/19 |
| | | 701/54 |
| 2016/0207525 A1* | 7/2016 | Nefcy .................... B60K 6/383 |
| 2016/0236540 A1* | 8/2016 | Ikeda .................... B60W 10/00 |

* cited by examiner

*Primary Examiner* — Gertrude Arthur Jeanglaude
(74) *Attorney, Agent, or Firm* — Morgan, Lewis & Bockius LLP

(57) ABSTRACT

An apparatus and method for accurately estimating the transfer torque of an engine clutch provided between an engine and a motor in a hybrid electric vehicle, may include a forward estimation device configured for determining a first estimate of engine clutch transfer torque using engine torque information, a reverse estimation device configured for determining a second estimate of the engine clutch transfer torque using a drive system model including wheels, a transmission, and a motor and using wheel speed information, a weight determination device configured for determining a weight based on brake input by a driver and whether predetermined devices in the vehicle are operated, and an estimate combination determination device configured for determining a final estimate of the engine clutch transfer torque as a value combined by applying a weight to the determined first estimate and the determined second estimate.

22 Claims, 4 Drawing Sheets

APPARATUS AND METHOD FOR ESTIMATING TORQUE OF ENGINE CLUTCH IN HYBRID ELECTRIC VEHICLE

CROSS-REFERENCE TO RELATED APPLICATION

The present application claims priority to Korean Patent Application No. 10-2017-0121259 filed on Sep. 20, 2017, the entire contents of which is incorporated herein for all purposes by this reference.

BACKGROUND OF THE INVENTION

Field of the Invention

The present invention relates to an apparatus and method for estimating the torque of an engine clutch in a hybrid electric vehicle. More particularly, the present invention relates to an apparatus and method for accurately estimating the transfer torque of an engine clutch provided between an engine and a motor in a hybrid electric vehicle.

Description of Related Art

A hybrid electric vehicle is a vehicle that utilizes two or more different kinds of drive sources. In general, a hybrid electric vehicle is a vehicle which is driven by an engine that obtains rotary power using fuels (i.e. fossil fuels including gasoline) and a motor that obtains rotary power using a battery.

The hybrid electric vehicle may have optimum output torque and maximum fuel economy depending on harmonious operation of the engine and the motor when the vehicle travels using both the engine and the motor.

The hybrid electric vehicle may have various types of drive systems using an engine and a motor. The drive systems may be classified into a transmission-mounted electric device (TMED) type drive system, in which the engine and motor are connected to each other via an engine clutch and a transmission is connected to the output side of the motor, and a flywheel-mounted electric device (FMED) type drive system, in which the motor is directly connected to a crankshaft of the engine and a transmission is connected via a flywheel.

In the TMED type hybrid system, the transmission is mounted at the output side of the motor configured for driving the vehicle, and an input shaft of the transmission is connected to an output shaft of the motor, whereby the motor speed is the transmission input speed (i.e. the rotation speed of the input shaft of the transmission).

The TMED type hybrid system may include an engine and a motor, which are drive sources for driving the vehicle, an engine clutch connecting the engine and the motor, a transmission connected to the output side of the motor, an inverter for driving the motor, and a battery, which is a power source of the motor, connected to the motor via the inverter to be charged and discharged.

Furthermore, the TMED type hybrid system may further include a motor connected to the engine to transmit power to the engine for starting the engine or generating electricity using rotary power received from the engine, i.e. a hybrid starter and generator (HSG).

The HSG may operate as a motor or a generator. Since the HSG is connected to the engine via a power transmission device including, for example, a belt and a pulley to constantly transmit power to the engine, the HSG may be used to control the speed of the engine.

The engine clutch is closed or opened by hydraulic pressure to interconnect the engine and the motor such that power can be transmitted between the engine and the motor or to disconnect the engine and the motor from each other. To drive the motor, the inverter converts DC current from the battery into three-phase AC current, which is supplied to the motor.

The transmission transmits the power of the motor or the combined power of the engine and the motor to the drive wheels. An automatic transmission (AT) or a double-clutch transmission (DCT) may be used as the transmission.

A vehicle provided with such a hybrid system, i.e. a hybrid electric vehicle (HEV) or a Plug-in HEV (PHEV), may travel in an electric vehicle (EV) mode, in which only the power of the motor (the drive motor) is used, or a hybrid electric vehicle (HEV) mode, in which both the power of the engine and the power of the motor are used.

Furthermore, when the vehicle is braked or coasts due to inertia, a regenerative mode, in which the kinetic energy of the vehicle is collected by the motor to charge the battery, is executed.

In the regenerative mode, the motor, which receives the kinetic energy of the vehicle, operates as a generator to charge the battery connected via the inverter.

Meanwhile, the motor (the drive motor) is further included in the hybrid electric vehicle. In terms of the drive system, therefore, the hybrid electric vehicle is different from an internal combustion engine vehicle, in which only the power of the engine is transmitted to the wheels via the transmission.

In the hybrid electric vehicle, the engine and the motor, which are different drive sources, may operate in a timely manner and achieve the optimum function without conflict therebetween.

Furthermore, the vehicle travelling using only the power of the motor may need the power of the engine depending on the circumstances. At this time, the change of the drive system through control of the engine clutch may be accurately achieved to prevent the driver from experiencing a sensation of discontinuity.

The performance of the vehicle in this regard is called the drivability of the vehicle.

Conventionally, engine clutch control which is closely connected to the achievement of the drivability of the hybrid electric vehicle is performed based on a map. The engine clutch control based on the map is accurately performed only when all variables are considered. For the present reason, extensive effect and time are necessary to generate a control map.

Furthermore, torque feedback control is necessary to secure better, more effective, and more consistent control performance. In the present case, information related to the transfer torque of the engine clutch is requisite.

In a conventional engine clutch transfer torque estimation method, however, it is necessary to estimate torque using the motor through intentional slip when the transmission clutch is in a neutral state.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and method for accurately estimating the transfer torque of an engine clutch in a hybrid system using an engine and a motor as drive sources of a vehicle, wherein the engine clutch is provided between the engine and the motor.

Various aspects of the present invention are directed to providing an apparatus and method for accurately estimating the transfer torque of an engine clutch in real time in a normal state and in a transient state without using an artificial slip learning mode or without operating or controlling an artificial device irrespective of the clutch, a transmission, and the state of a vehicle.

Various aspects of the present invention are directed to providing an apparatus for estimating torque of an engine clutch in a hybrid electric vehicle including a forward estimation device configured for determining a first estimate of engine clutch transfer torque using engine torque information, a reverse estimation device configured for determining a second estimate of the engine clutch transfer torque using a drive system model including wheels, a transmission, and a motor and using wheel speed information, a weight determination device configured for determining a weight based on brake input by a driver and whether predetermined devices in the vehicle are operated, and an estimate combination determination device configured for determining a final estimate of the engine clutch transfer torque as a value combined by applying a weight to the determined first estimate and the determined second estimate.

Various aspects of the present invention are directed to providing a method of estimating torque of an engine clutch in a hybrid electric vehicle including determining a first estimate of engine clutch transfer torque using engine torque information, determining a second estimate of the engine clutch transfer torque using a drive system model including wheels, a transmission, and a motor and using wheel speed information, determining a weight based on brake input by a driver and whether predetermined devices in the vehicle are operated, and determining a final estimate of the engine clutch transfer torque as a value combined by applying a weight to the determined first estimate and the determined second estimate.

Other aspects and exemplary embodiments of the invention are discussed infra.

It is understood that the term "vehicle" or "vehicular" or other similar term as used herein is inclusive of motor vehicles in general including passenger vehicles including sports utility vehicles (SUV), buses, trucks, various commercial vehicles, watercraft including a variety of boats and ships, aircraft, and the like, and may include hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1:
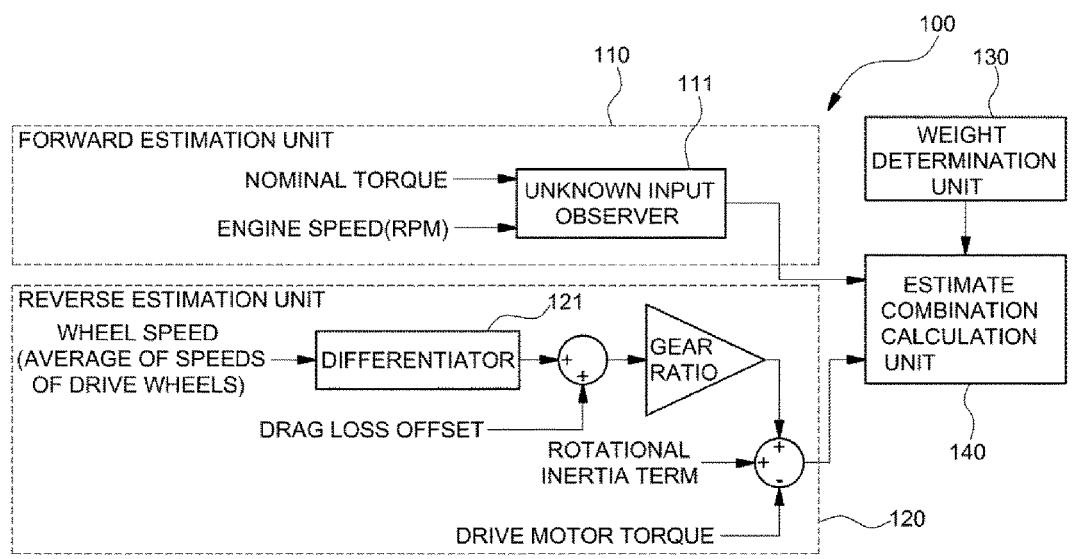
FIG. 1 is a diagram showing the structure of an engine clutch torque estimation apparatus according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described more specifically with reference to the accompanying drawings to allow those skilled in the art to easily practice the present invention.

Advantages and features of the present invention and methods for achieving the same will be clearly understood with reference to the following detailed description of embodiments However, the present invention is not limited to the exemplary embodiments included herein, and may be implemented in various different forms. The exemplary embodiments are merely provided for completeness of the disclosure of the present invention and to completely instruct the scope of the invention to those skilled in the art, and the present invention should be defined by the scope of claims.

Furthermore, in the description of the present invention, a detailed description of related known technologies and the like will be omitted when it is judged that the same would make the subject of the present invention unclear.

The terms "comprises" and "comprising" used herein should be interpreted not to exclude other elements but to further include such other elements unless mentioned otherwise.

Various aspects of the present invention are directed to providing an apparatus and method for estimating the transfer torque of an engine clutch in a hybrid electric vehicle.

Various aspects of the present invention are directed to providing an apparatus and method that are configured for estimating and monitoring the transfer torque of an engine clutch in real time based on an engine torque map and a drive system model, which is characterized in that the transfer torque of the engine clutch is accurately estimated in real time based on information related to engine torque in a normal state and based on a drive system model, which is very reactive, and information related to the speed of wheels in a transient state.

The present invention may apply to a parallel-type hybrid system that utilizes an engine and a motor as drive sources and includes an engine clutch for allowing power to be transmitted between the engine and the motor or blocking power from being transmitted between the engine and the motor or to a transmission-mounted electric device (TMED) type hybrid system.

FIG. 1 is a diagram showing the structure of an engine clutch torque estimation apparatus according to an exemplary embodiment of the present invention.

As shown, the engine clutch torque estimation apparatus according to the exemplary embodiment of the present invention, denoted by reference numeral 100, includes a forward estimation device 110 for determining an engine clutch transfer torque estimate based on engine torque information (i.e. a first estimate), a reverse estimation device 120 for determining an engine clutch transfer torque estimate based on wheel speed information (i.e. a second estimate) using a drive system model including wheels, a transmission, and a motor (a drive motor), a weight determination device 130 for determining a weight to be applied to each determined torque estimate, and an estimate combination determination device 140 for determining a final engine clutch transfer torque estimate as a value combined by applying the weight to each determined torque estimate.

The forward estimation device 110 is configured to estimate the transfer torque of the engine clutch using engine torque information. The forward estimation device 110 estimates engine clutch transfer torque using feedback information including engine torque and engine speed measured and collected in real time by a detection element in a vehicle.

The forward estimation device 110 includes an unknown input observer 111 having nominal torque and engine speed (RPM) as input. Here, the nominal torque includes nominal engine torque and nominal engine clutch torque.

The unknown input observer 111 estimates engine clutch transfer torque using setting information input and stored in advance together with feedback information including nominal torque and engine speed.

Here, the unknown input observer 111 may be a PI-type observer. The setting information may include a damper inertia value and a P gain $I_{f1}$ and an I gain $I_{f2}$ of the PI-type observer.

In the following description, an engine clutch transfer torque value (i.e. a first estimate) estimated by the forward estimation device 110 will be referred to as a forward estimate.

The reverse estimation device 120 is configured to estimate the transfer torque of the engine clutch in a drive system model based on wheel speed information in a vehicle. The reverse estimation device 120 includes a differentiator 121 for receiving wheel speed information detected in real time by a wheel speed detector and outputting a wheel-speed differential value (wheel acceleration).

The reverse estimation device 120 estimates the transfer torque of the engine clutch using information collected in real time in a vehicle including motor torque (hereinafter, the term "motor" refers to a drive motor), motor speed, vehicle load torque, and real-time transmission state information, and setting information input and stored in advance together with the wheel speed information.

In the reverse estimation device 120, the wheel speed may be an average wheel speed of the vehicle. The differentiator 121 may be configured to receive a signal indicating the average wheel speed and to output a signal indicating a wheel-speed differential value (a wheel acceleration signal).

The motor speed may be detected in real time by a detector (a resolver). The real-time transmission state information may include a gear ratio of the current transmission stage, a rotation speed of an input shaft fastened to the current transmission stage for power transmission, and a final reduction ratio depending on the fastened input shaft. The setting information in the reverse estimation device 120 may include information including motor and input shaft inertia values and a vehicle inertia value.

The estimate combination determination device 140 may be realized in a form of a Luenberger-like observer. The estimate combination determination device 140 determines a final engine clutch transfer torque value as a value combined by applying a weight to the torque estimates determined by the forward estimation device 110 and the reverse estimation device 120.

The estimate combination determination device 140 receives a forward estimate, determined in real time and output by the forward estimation device 110, and a reverse estimate, determined in real time and output by the reverse estimation device 120, determines a feedback weight and a feedforward weight based on the brake input by a driver and whether a predetermined device in the vehicle is operated, and determines a final engine clutch transfer torque value from the forward estimate and the reverse estimate using the determined feedback weight and the determined feedforward weight.

The method and process of determining the feedback weight and the feedforward weight will be described more specifically below.

In an exemplary embodiment of the present invention, as described above, the torque estimation apparatus 100, which estimates the transfer torque of the engine clutch in real time, includes a forward estimation device 110, a reverse estimation device 120, and an estimate combination determination device 140.

In the forward estimation, in which the transfer torque is estimated in the forward direction based on the engine clutch using information from the engine, the engine clutch transfer torque is estimated based on relatively accurate engine torque information in a normal state. Consequently, forward estimation accuracy is high in the normal state, but reactivity is low in a transient state.

In the reverse estimation, in which the transfer torque is estimated in the reverse direction based on the engine clutch using information from the wheels, the engine clutch transfer torque is estimated from the wheel speed based on a drive system model, which is very reactive in the transient state. Consequently, reactivity is high in the transient state although stability is low in the normal state.

A more detailed description thereof will be made with reference to FIG. 2.

Figure 2:
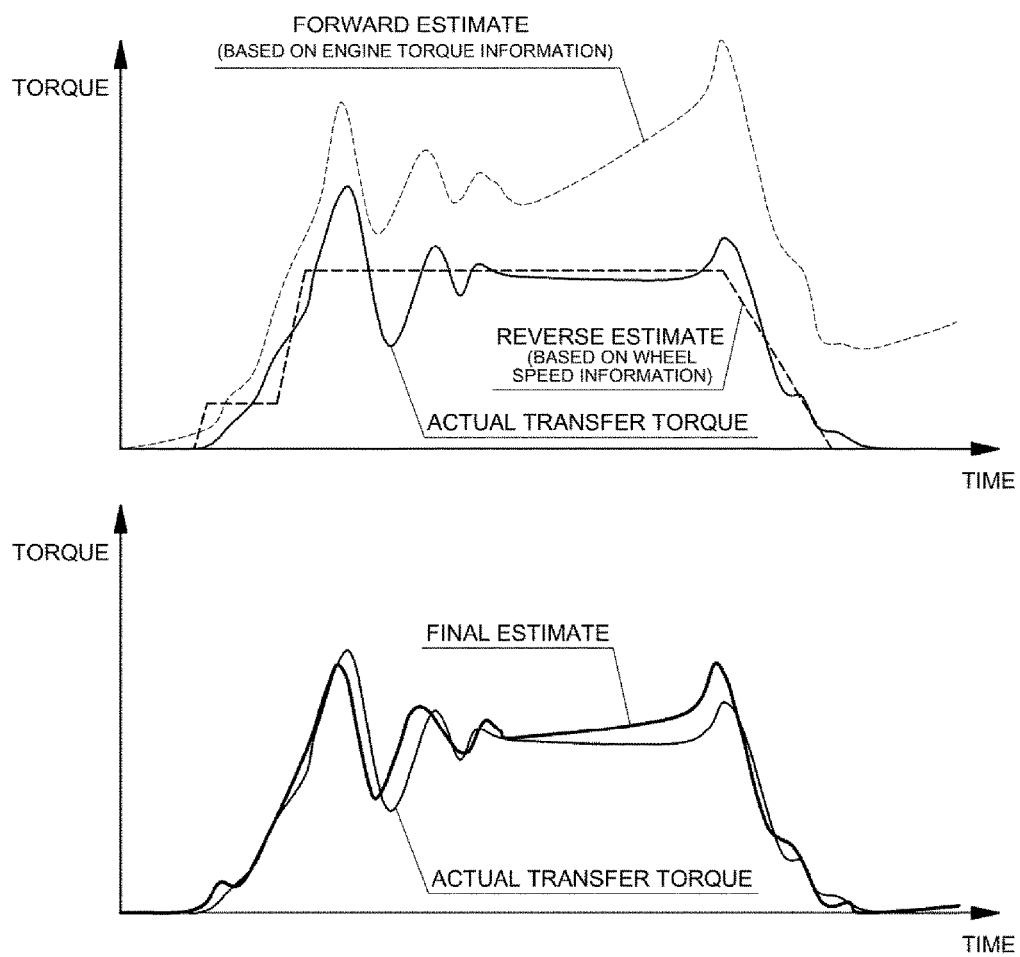
FIG. 2 is a view describing the improvement of estimation accuracy through combination of a forward estimate and a reverse estimate in an engine clutch torque estimation method according to an exemplary embodiment of the present invention.

FIG. 2 is a view describing the improvement of estimation accuracy through a combination of a forward estimate and a reverse estimate in an engine clutch torque estimation method according to an exemplary embodiment of the present invention.

The upper figure of FIG. 2 shows an example of engine clutch transfer torque (forward estimate) estimated using only actual engine clutch transfer torque and engine torque and an example of engine clutch transfer torque (reverse estimate) estimated using wheel speed information.

The lower figure of FIG. 2 shows an example of a final estimate determined as a value obtained by combining a forward estimate and a reverse estimate using a weight in accordance with the engine clutch torque estimation method according to an exemplary embodiment of the present invention.

As can be seen from the upper figure of FIG. 2, the forward estimate and the reverse estimate are very different from the actual transfer torque. As can be seen from the lower figure of FIG. 2, the, however, the final estimate of the transfer torque according to an exemplary embodiment of the present invention is approximate to the actual transfer torque.

In the engine clutch transfer torque estimation method using only the engine torque information, a torque estimate (a forward estimate based on engine torque information) is determined based on an engine performance map, with the result that estimation accuracy is low in a transient state (left part) or when a disturbance occurs (right part), as shown in FIG. 2.

In the estimation method based on the wheel speed information, however, an estimate (a reverse estimate based on wheel speed information) is determined using the result of the transferred torque, with the result that reactivity is high in the transient state, i.e. estimation performance is high. When a disturbance occurs in braking input, the gradient of a load, or weight of the vehicle, however, the estimation performance is not consistent.

In an exemplary embodiment of the present invention, therefore, pieces of information estimated using two methods are combined to determine a final value, whereby it is possible to obtain a final estimate which is approximate to the actual transfer torque and is precise.

Figure 3:
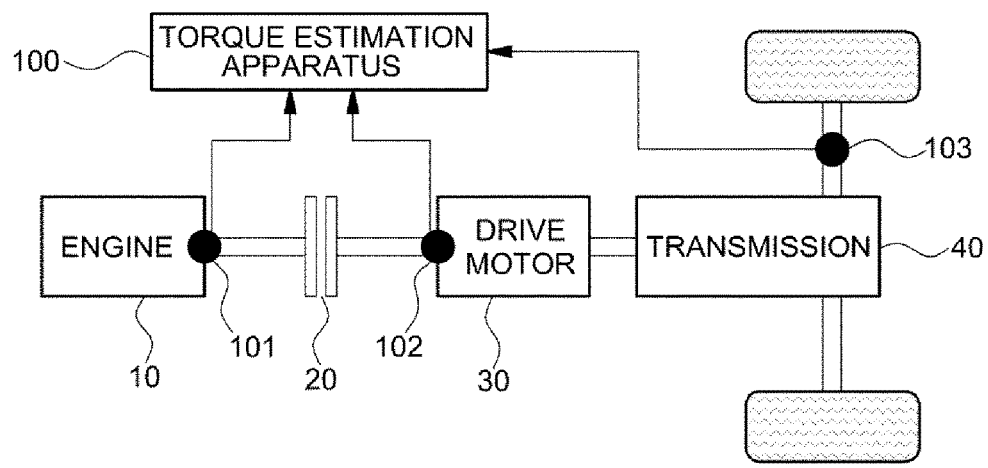
FIG. 3 is a view showing the torque estimation apparatus according to the exemplary embodiment of the present invention and a drive system of a hybrid electric vehicle.

FIG. 3 is a view showing the torque estimation apparatus according to the exemplary embodiment of the present invention and a drive system of a hybrid electric vehicle. There are shown an engine 10 and a motor (drive motor) 30, which are vehicle drive sources, an engine clutch 20 for allowing power to be transmitted between the engine 10 and the motor 30 or blocking power from being transmitted between the engine 10 and the motor 30, and a transmission 40 connected to the output side of the motor.

As shown, the torque estimation apparatus 100 estimates the transfer torque of the engine clutch 20 based on information collected by detectors 101, 102, and 103 for the engine 10, the motor 30, and the drive wheels.

Conventionally, only the engine torque information is used to estimate the transfer torque of the engine clutch. Only in an artificial slip learning mode, therefore, is torque estimation possible. In an exemplary embodiment of the present invention, however, transfer torque is estimated based on the drive system model and various real-time collection information (engine torque, engine speed, motor torque, motor speed, wheel speed, gear ratio, etc.), and no slip learning mode is required.

Hereinafter, a torque estimate determination method performed by the forward estimation device 110 and the reverse estimation device 120 will be described in more detail.

The following equations are provided for forward estimation of the engine clutch transfer torque.

$$\hat{T}_{ec,f} = T_{ec,n} + \hat{\tilde{T}}_{ec,f} \quad (1)$$

$$\dot{\hat{\omega}}_c = \frac{1}{J_d} T_{ec,n} - \frac{1}{J_d}\left(T_{ec,n} + \hat{\tilde{T}}_{ec,f}\right) + l_{f1}(\omega_e - \hat{\omega}_e) \quad (2)$$

$$\dot{\hat{\tilde{T}}}_{ec,f} = -l_{f2}(\omega_e - \hat{\omega}_e) \quad (3)$$

As can be seen from Equation (1), in the forward estimation device 110, a forward estimate $\hat{T}_{ec,f}$ may be determined as a value obtained by adding nominal engine clutch torque $T_{ec,n}$ and an error estimate $\hat{\tilde{T}}_{ec,f}$.

Here, the nominal engine clutch torque $T_{ec,n}$ may be obtained from actuator stroke information related to the engine clutch.

In general, the engine clutch is operated by hydraulic pressure generated, controlled, and supplied by an actuator. Although not shown, the actuator includes a motor controlled by a controller, a power conversion mechanism for converting the rotating force of the motor into linear force, and a master cylinder for generating hydraulic pressure controlled by controlling the forward-rearward stroke movement and the position of a piston receiving the linear force converted by the power conversion mechanism.

In the actuator, actuator stroke information, i.e. information related to the position value of the piston of the master cylinder, is detected by a travel detector. In general, the position value information is used as feedback information for controlling the actuator.

In connection therewith, the nominal engine clutch torque $T_{ec,n}$ in Equation (1) may be obtained from actuator stroke information, which is detector detection information. In estimation of the forward estimation device configured for determining the forward estimate $\hat{T}_{ec,f}$, the unknown input observer 111 of the forward estimation device 110 may estimate only an error estimate $\hat{\tilde{T}}_{ec,f}$, whereby it is possible to reduce the arithmetic load on the unknown input observer 111.

The error estimate $\hat{\tilde{T}}_{ec,f}$ may be estimated through Equations (2) and (3). The unknown input observer 111 is set as indicated in Equations (2) and (3) using the engine torque information and engine speed feedback, the unknown input observer 111 estimates the error estimate $\hat{\tilde{T}}_{ec,f}$ therefrom, and the error estimate $\hat{\tilde{T}}_{ec,f}$ is added to the nominal engine clutch torque $T_{ec,n}$ to obtain the forward estimate $\hat{T}_{ec,f}$.

Referring to Equations (2) and (3), the error estimate $\hat{\tilde{T}}_{ec,f}$ is determined using engine speed $\omega_e$, the nominal engine clutch torque $T_{ec,n}$, nominal engine torque $T_{e,n}$, damper inertia value $J_d$, and other setting information including the P gain $I_{f1}$ and the I gain $I_{f2}$.

The following equations are provided for reverse estimation of the engine clutch transfer torque.

$$\hat{T}_o = J_v \dot{\omega}_w + T_v \quad (4)$$

$$\hat{T}_{ec,r} = -T_m + J_m \dot{\omega}_m + J_{e1} \dot{\omega}_{c1} + \frac{\hat{T}_o}{i_{t1} i_{f1}} \quad (5)$$

$$\hat{T}_{ec,r} = -T_m + J_m \dot{\omega}_m + J_{e2} \dot{\omega}_{c2} + \frac{\hat{T}_o}{i_{t2} i_{f2}} \quad (6)$$

The reverse estimation device 120 determines a reverse estimate $\hat{T}_{ec,r}$ based on wheel speed information. As indicated in Equation (4), an engine clutch output shaft torque estimate $\hat{T}_o$ is obtained using a wheel-speed differential value, which is the output of the differentiator 121 that has the wheel speed as an input, i.e. wheel acceleration $\dot{\omega}_w$, vehicle load torque, and a vehicle inertia value $J_v$ selected from among the setting information.

At the present time, the output shaft torque estimate $\hat{T}_o$ is a value obtained by differentiating wheel speed $\omega_w$, multiplying a differential value of the wheel speed (wheel acceleration) $\dot{\omega}_w$ by the vehicle inertia value, and offsetting the resultant value by load torque (corresponding to a drag loss offset of FIG. 1).

Furthermore, the reverse estimate $\hat{T}_{ec,r}$ based on a transmission state is determined using Equation (5) or (6) from the engine clutch output shaft torque estimate $\hat{T}_o$, the motor torque $T_m$, the motor speed $\omega_m$ (or the differential value, i.e. acceleration $\dot{\omega}_m$), transmission state information, and other setting information.

Here, the transmission state information may include gear ratios at the current transmission stage $i_{t1}$ and $i_{t2}$, rotation speeds of the input shafts fastened for power transmission at the current transmission stage $\omega_{e1}$ and $\omega_{e2}$, and final reduction ratios depending on the fastened input shafts $i_{f1}$ and $i_{f2}$. The setting information may include a motor inertia value $J_m$ and input shaft inertia values $J_{e1}$ and $J_{e2}$.

In determining the reverse estimate $\hat{T}_{ec,r}$ of the engine clutch transfer torque, the reverse estimate $\hat{T}_{ec,r}$ is determined by offsetting the output shaft torque estimate $\hat{T}_o$ by the motor torque and the input shaft inertia values. The reverse estimate $\hat{T}_{ec,r}$ is determined using Equation (5) only when a first input shaft clutch of the transmission is fastened (i.e. the gear ratio of the first input shaft is not changed). When a second input shaft clutch is fastened, the reverse estimate $\hat{T}_{ec,r}$ is determined using Equation (6).

The symbols used in the above equations are defined as follows.

$T_{e,n}$: Nominal engine torque
$T_{ec,n}$: Nominal engine clutch torque
$\hat{T}_{ec,f}$: Forward estimate of engine clutch torque
$\hat{T}_{ec,r}$: Reverse estimate of engine clutch torque
$T_m$: Drive motor torque
$T_o$: Output shaft torque
$T_v$: Vehicle load torque
$J_d$: Damper inertia value
$J_m$: Drive motor inertia value
$J_{e1}$: Inertia value of first input shaft of transmission
$J_{e2}$: Inertia value of second input shaft of transmission
$J_v$: Vehicle inertia value
$\omega_e$: Engine speed
$\omega_m$: Drive motor speed
$\omega_{e1}$: Speed of first input shaft of the transmission
$\omega_{e2}$: Speed of second input shaft of the transmission
$\omega_w$: Wheel speed
$i_t$: Gear ratio of transmission
$i_f$: Final reduction ratio
$\hat{\phantom{x}}$: Estimate
$\tilde{\phantom{x}}$: Error
$I_{f1}$: P gain of PI-type observer in forward estimation unit
$I_{f2}$: I gain of PI-type observer in forward estimation unit When the forward estimate $\hat{T}_{ec,f}$ and the reverse estimate $\hat{T}_{ec,r}$ are determined by the forward estimation device 110 and the reverse estimation device 120, the estimate combination determination device 140 determines a final engine clutch transfer torque estimate $\hat{T}_{ec}$ by combining the observed values (estimates) using a weight.

That is, the estimate combination determination device 140 receives the forward estimate and the reverse estimate, determined respectively by the forward estimation device 110 and the reverse estimation device 120, and determines a final engine clutch transfer torque estimate using the received estimates and a weight.

The weight may include a feedforward weight and a feedback weight. The feedforward weight and the feedback weight may be determined by the weight determination device 130.

The weight determination device 130 determines the feedforward weight and the feedback weight based on information collected in real time in the vehicle. The feedforward weight and the feedback weight are variables, which vary depending on the collected information.

The information collected in the vehicle to determine the weight, which becomes a disturbance factor that may causes a disturbance with respect to the engine clutch transfer torque estimate, may include information indicating the brake input by a driver and whether the device in the vehicle is operated.

The weight determination device 130 determines the feedforward weight and the feedback weight as values corresponding to the brake input by the driver and whether the device in the vehicle is operated. The determined feedforward weight and feedback weight are input to the estimate combination determination device 140 to determine a final transfer torque estimate.

The estimate combination determination device 140 determines a final engine clutch transfer torque estimate as a value combined by applying the feedforward weight and the feedback weight to the forward estimate and the reverse estimate.

This is indicated as represented by Equation (7).

$$\dot{\hat{T}}_{ec} = L_{ff}\dot{\hat{T}}_{ec,r} + L_{fb}(\hat{T}_{ec,f} - \hat{T}_{ec}) \qquad (7)$$

As indicated in Equation (7), a final engine clutch transfer torque estimate $\hat{T}_{ec}$ is determined using Equation (7) from the forward estimate $\hat{T}_{ec,f}$, the reverse estimate $\hat{T}_{ec,r}$, the feedforward weight $L_{ff}$, and the feedback weight $L_{fb}$.

At the present time, a differential value $\dot{\hat{T}}_{ec,r}$ of the reverse estimate $\hat{T}_{ec,r}$ may be used. The differential value $\dot{\hat{T}}_{ec,r}$ of the reverse estimate $\hat{T}_{ec,r}$ and the forward estimate $\hat{T}_{ec,f}$ is applied to a Luenberger-like observer corresponding to Equation (7) as a feedforward item and a feedback item.

In an exemplary embodiment of the present invention, as previously described, the feedforward weight $L_{ff}$ and the feedback weight $L_{fb}$ vary depending on the brake input by the driver and whether the device in the vehicle is operated to change a weight per condition between the forward estimate and the reverse estimate. A weight determination method will be described with reference to FIG. 4 and FIG. 5.

Figure 4:
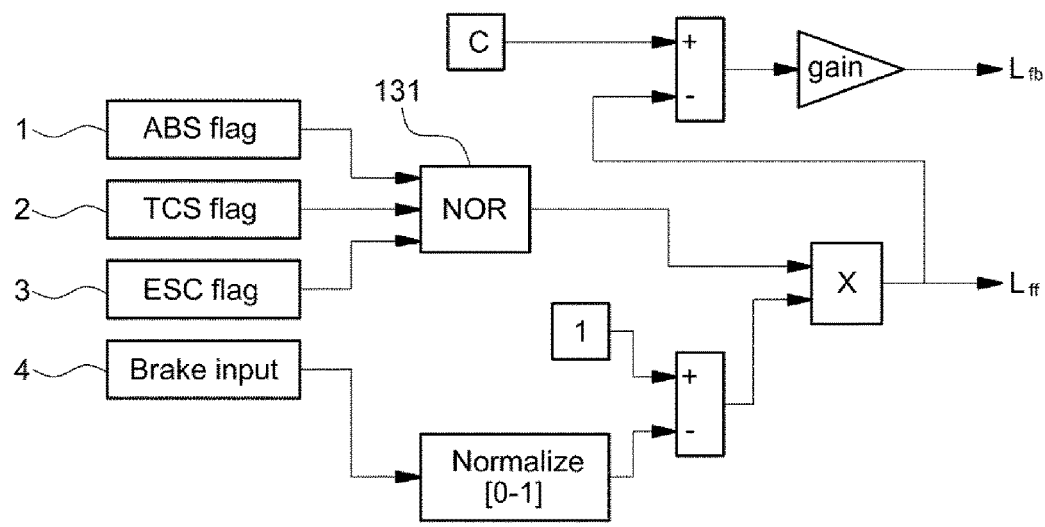
FIG. 4 is a view illustrating a weight determination device of the torque estimation apparatus according to the exemplary embodiment of the present invention.
Figure 5:
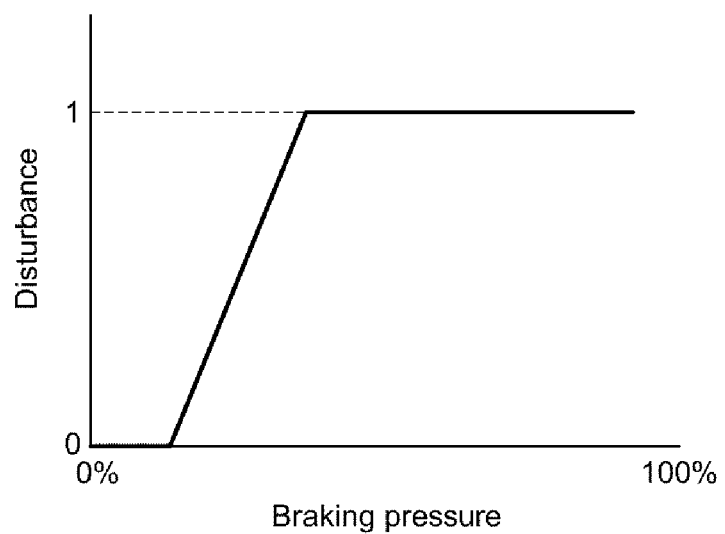
FIG. 5 is a view illustrating a normalized disturbance value depending on brake input in an exemplary embodiment of the present invention.

FIG. 4 is a view illustrating a weight determination device, and FIG. 5 is a view illustrating a normalized disturbance value depending on brake input.

As illustrated in FIG. 4, the feedforward weight $L_{ff}$ and the feedback weight $L_{fb}$ are determined based on brake input 4 by the driver and a value based on whether a device in the vehicle is operated. Such a device in the vehicle may include an anti-lock brake system (ABS), a traction control system (TCS), and an electronic stability control (ESC).

Referring to the example of FIG. 4, when the ABS, the TCS, and the ESC are not operated and thus flags 1 to 3 indicating the operation of the devices are not input, a NOR logical operation device 131 of the weight determination device 130 outputs "1." When at least one of the devices is operated and thus at least one of the flags 1 to 3 is input, the NOR logical operation device 131 outputs "0."

Referring to the example of FIG. 4, therefore, when at least one of the devices is operated, the feedforward weight is determined as 0, and the feedback weight is determined as the product of a stored setting value C and a predetermined gain.

Furthermore, the brake input by the driver may be a brake input value, which is a value depending on the manipulation of a brake pedal. The brake input by the driver may be a value (%) corresponding to braking pressure, pedal force, or a brake pedal stroke. For example, the brake input by the driver may be a brake pedal stroke detector (BPS) value (%).

Referring to the example of FIG. 4, when a normalized disturbance value $D_B$, which is determined to be a value selected from between 0 and 1 depending on the brake input by the driver, is obtained, the magnitude of the feedforward weight is increased in proportion to $1-D_B$.

This is set to decrease the magnitude of the feedforward weight $L_{ff}$ and to increase the magnitude of the feedback weight $L_{fb}$, since the extent of disturbance is increased as the magnitude of the brake input by the driver is increased, whereby accuracy of the reverse torque estimation is reduced.

In brief, when the brake input by the driver occurs or the device in the vehicle, e.g., the electronic stability control, is operated with the result that a disturbance occurs, the magnitude of the feedforward weight $L_{ff}$ is decreased, and the magnitude of the feedback weight $L_{fb}$ is increased.

FIG. 5 illustrates setting data having a normalized disturbance value predetermined to a value selected from between 0 and 1 depending on a brake input value (%). As illustrated, setting data defining the correlation between the brake input value (%) and the normalized disturbance value is input and stored in the weight determination device 130 in advance such that the setting data is used to determine the normalized disturbance value from the brake input value (%).

Equations (8) and (9) are provided for determination of the feedforward weight and the feedback weight. The two weights may be determined by Equations (8) and (9).

$$L_{ff}=(1-D_B)\times D_S \tag{8}$$

$$L_{fb}=(C-L_{ff})\times K \tag{9}$$

As indicated in Equation (9), the feedback weight may be determined using the feedforward weight determined using Equation (8). The feedback weight may be determined from a setting value C, a gain K, and the feedforward weight using Equation (9).

As shown in FIG. 8, the feedforward weight may be determined by a normalized disturbance value $D_B$, determined to be a value selected from between 0 and 1 in a response to the brake input value (%) and a NOR logical value $D_S$ depending on whether the specific device in the vehicle including the ABS, the TCS, or the ESC, is operated.

When at least one of the devices in the vehicle, i.e. the ABS, the TCS, and the ESC, is operated, $D_S$ becomes 0. When none of the apparatuses are operated, $D_S$ becomes 1.

For example, in the case in which C is set to 2.5 and K is set to 2 by the weight determination device 130, when the driver is not depressing the brake pedal, whereby there is no brake input, and none of the devices in the vehicle are operated, the normalized disturbance value $D_B$ is 0, and the NOR logical value $D_S$ is 1. Using Equations (8) and (9), therefore, the feedforward weight $L_{ff}$ may be determined to be 1, and the feedback weight $L_{fb}$ may be determined to be 3.

Furthermore, when the normalized disturbance value $D_B$ is determined to be 0.5 from the setting data shown in FIG. 5 depending upon the brake input value at the time of braking and none of the devices in the vehicle are operated, the NOR logical value $D_S$ is 1. By Equations (8) and (9), therefore, the feedforward weight $L_{ff}$ may be determined to be 0.5, and the feedback weight $L_{fb}$ may be determined to be 4.

Furthermore, when the normalized disturbance value $D_B$ is determined to be 1 from the setting data shown in FIG. 5 depending upon the brake input value at the time of braking and at least one of the devices in the vehicle, i.e. the ABS, the TCS, or the ESC, is operated, the NOR logical value $D_S$ is 0. By Equations (8) and (9), therefore, the feedforward weight $L_{ff}$ may be determined to be 0, and the feedback weight $L_{fb}$ may be determined to be 5.

As is apparent from the above description, in the engine clutch torque estimation apparatus and method according to an exemplary embodiment of the present invention, engine clutch transfer torque is estimated through the combination of information based on accurate engine torque information in a normal state and a drive system model, which is very reactive, and wheel speed information in a transient state, whereby estimation more accurate than that of a conventional apparatus and method is possible.

Also, in the engine clutch torque estimation apparatus and method according to an exemplary embodiment of the present invention, the engine clutch transfer torque is accurately estimated in real time in the normal state and in the transient state irrespective of the clutch, the transmission, and the state of the vehicle, and the transfer torque is continuously estimated without using an artificial slip learning mode and without operating or controlling an artificial device, whereby unnecessary energy consumption is reduced.

Also, in the engine clutch torque estimation apparatus and method according to an exemplary embodiment of the present invention, the transfer torque is constantly estimated with high accuracy both in the normal state and in the transient state, whereby it is possible to accurately and consistently control the engine clutch using the estimate and thus to contribute to the improvement in drivability of a hybrid electric vehicle.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for estimating transfer torque of an engine clutch in a hybrid electric vehicle using a motor and an engine as drive sources the engine clutch being provided between the engine and the motor, the apparatus comprising:
a forward estimation device configured for determining a first estimate of engine clutch transfer torque using engine torque information;
a reverse estimation device configured for determining a second estimate of the engine clutch transfer torque using a drive system model including wheels, a transmission, and a motor and using wheel speed information;
a weight determination device configured for determining a feedforward weight and a feedback weight based on brake input by a driver and whether predetermined devices in the vehicle are operated; and
an estimate combination determination device configured for receiving the determined first estimate and the determined second estimate from the forward estimation unit and the reverse estimation unit and determining a final estimate of the engine clutch transfer torque as a value combined by applying the feedforward weight and the feedback weight to the determined first estimate and the determined second estimate, the final estimate being used in controlling the engine clutch.

2. The apparatus of claim 1, wherein the forward estimation device is configured to determine the first estimate using nominal engine torque, engine speed, nominal engine clutch torque, and stored setting information as the engine torque information.

3. The apparatus of claim 2, wherein
the forward estimation device is configured to determine the first estimate as a value obtained by adding the nominal engine clutch torque and an error estimate, and
the error estimate is determined from the nominal engine torque, the engine speed, the nominal engine clutch torque, and the stored setting information using a first equation and a second equation, wherein the first equation is $\dot{\hat{\omega}}_e = \frac{1}{J_d}T_{e,n} - \frac{1}{J_d}\left(T_{ec,n} + \hat{\tilde{T}}_{ec,f}\right) + l_{f1}(\omega_e - \hat{\omega}_e),$ wherein the second equation is $\dot{\hat{\tilde{T}}}_{ec,f} = -l_{f2}(\omega_e - \hat{\omega}_e),$ and wherein:
$\tilde{T}_{ec,f}$: Error estimate,
$T_{e,n}$: Nominal engine torque,
$T_{ec,n}$: Nominal engine clutch torque,
$J_d$: Damper inertia value,
$\omega_e$: Engine speed,
$l_{f1}$: P gain of PI-type observer in forward estimation device,
$l_{f2}$: I gain of PI-type observer in forward estimation device,
$\hat{}$: Estimate,
$\tilde{}$: Error, and
$\dot{}$: Differential value.

4. The apparatus of claim 1, wherein the reverse estimation device is configured to determine the second estimate using wheel speed, actuator torque, actuator speed, vehicle load torque, transmission state information, and stored setting information.

5. The apparatus of claim 4, wherein the reverse estimation device is configured to determine an engine clutch output shaft torque estimate using wheel acceleration obtained from the wheel speed, the vehicle load torque, and a vehicle inertia value selected among the stored setting information, and is configured to determine the second estimate using the engine clutch output shaft torque estimate, a motor torque, a motor speed, the transmission state information, and the stored setting information.

6. The apparatus of claim 5, wherein
the transmission state information includes a gear ratio of a current transmission stage, a rotation speed of an input shaft fastened to a current transmission stage for power transmission, and a final reduction ratio depending on the fastened input shaft, and
the stored setting information for determining the second estimate includes a motor inertia value and an input shaft inertia value.

7. The apparatus of claim 6, wherein the reverse estimation device is configured to determine the second estimate using a third equation and a fourth equation or using the third equation and a fifth equation depending on the input shaft fastened to the current transmission stage for power transmission, wherein the third equation is $\hat{T}_o = J_v \dot{\omega}_w + T_v,$ wherein the fourth equation is $\hat{T}_{ec,r} = -T_m + J_m\dot{\omega}_m + J_{e1}\dot{\omega}_{c1} + \frac{\hat{T}_o}{i_{t1}i_{f1}},$ wherein the fifth equation is $\hat{T}_{ec,r} = -T_m + J_m\dot{\omega}_m + J_{e2}\dot{\omega}_{c2} + \frac{\hat{T}_o}{i_{t2}i_{f2}},$ and wherein:
$\hat{T}_{ec,r}$: Second estimate,
$T_m$: Drive motor torque,
$T_o$: Output shaft torque,
$T_v$: Vehicle load torque,
$J_m$: Drive motor inertia value,
$J_{e1}$: Inertia value of first input shaft of transmission,
$J_{e2}$: Inertia value of second input shaft of transmission,
$\omega_m$: Drive motor speed,
$\omega_{e1}$: Speed of first input shaft of the transmission,
$\omega_{e2}$: Speed of second input shaft of the transmission,
$i_{t1}$ and $i_{t2}$: Gear ratios depending on fastened input shafts,
$i_{f1}$ and $i_{f2}$: Final reduction ratios depending on the fastened input shafts,
$\hat{}$: Estimate,
$\tilde{}$: Error, and
$\dot{}$: Differential value.

8. The apparatus of claim 1,
wherein the estimate combination determination device is configured to determine the final estimate of the engine clutch transfer torque from a sixth equation using the feedforward weight and the feedback weight determined by the weight determination device, wherein the sixth equation is $$\hat{T} = L_{ff}\hat{T}_{ec,r} + L_{fb}(\hat{T}_{ec,f} - \hat{T}_{ec}), \text{ and}$$

wherein:
- $\hat{T}_{ec,f}$: First estimate,
- $\hat{T}_{ec,r}$: Second estimate,
- $L_{ff}$: Feedforward weight,
- $L_{fb}$: r Feedback weight,
- $\hat{T}_{ec}$: Final estimate of engine clutch transfer torque, and
- $\dot{\hat{T}}_{ec,r}$: Differential value of second estimate.

9. The apparatus of claim 8, wherein
the weight determination device is configured to determine the feedforward weight to be 0 when at least one of the predetermined devices in the vehicle is configured to be operated, and
the weight determination device is configured to determine the feedforward weight to be a smaller value and the feedback weight to be a larger value as a value of the brake input by the driver is increased.

10. The apparatus of claim 1, wherein
the weight determination device is configured to determine the feedforward weight and the feedback weight to be applied to the first estimate and the second estimate, respectively, and
the feedforward weight and the feedback weight are determined from a seventh equation and an eighth equation,
wherein the seventh equation is $$L_{ff} = (I - D_8) \times D_S,$$

wherein the eighth equation is $$L_{fb} = (C - L_{ff}) \times K, \text{ and}$$

wherein:
- $L_{ff}$: Feedforward weight,
- $L_{fb}$: Feedback weight,
- $D_B$: Normalized disturbance value determined to be value selected from between 0 and 1 in a response to brake input by driver
- $D_S$: Value determined to be 1 when no predetermined devices in vehicle are operated and to be 0 when at least one predetermined device in vehicle is operated,
- C: Stored setting value, and
- K: Predetermined gain.

11. The apparatus of claim 10, wherein the normalized disturbance value is set to be a larger value as a value of the brake input by the driver is increased.

12. A method of estimating transfer torque of an engine clutch in a hybrid electric vehicle using a motor and an engine as drive sources, the engine clutch being provided between the engine and the motor, the method comprising:
determining a first estimate of engine clutch transfer torque using engine torque information;
determining a second estimate of the engine clutch transfer torque using a drive system model including wheels, a transmission, and a motor and using wheel speed information;
determining a weight based on brake input by a driver and whether predetermined devices in the vehicle are operated; and
receiving the determined first estimate and the determined second estimate from the forward estimation unit and the reverse estimation unit and determining a final estimate of the engine clutch transfer torque as a value combined by applying a weight to the determined first estimate and the determined second estimate, the final estimate being used in controlling the engine clutch.

13. The method of claim 12, wherein the step of determining the first estimate includes determining the first estimate using nominal engine torque, engine speed, nominal engine clutch torque, and stored setting information as the engine torque information.

14. The method of claim 13, wherein the step of determining the first estimate includes determining the first estimate as a value obtained by adding the nominal engine clutch torque and an error estimate, the error estimate being determined from the nominal engine torque, the engine speed, the nominal engine clutch torque, and the stored setting information using a first equation and a second equation, wherein the first equation is $\dot{\hat{\omega}}_e =$ $$\frac{1}{J_d}T_{e,n} - \frac{1}{J_d}\left(T_{ec,n} + \hat{\tilde{T}}_{ec,f}\right) + l_{f1}(\omega_e - \hat{\omega}_e),$$

wherein the second equation is $\dot{\hat{\tilde{T}}}_{ec,f} = -l_{f2}(\omega_e - \hat{\omega}_e)$, and wherein:
- $\tilde{T}_{ec,f}$: Error estimate,
- $T_{e,n}$: Nominal engine torque,
- $T_{ec,n}$: Nominal engine clutch torque,
- $J_d$: Damper inertia value,
- $\omega_e$: Engine speed,
- $l_{f1}$: P gain of PI-type observer in forward estimation device,
- $l_{f2}$: I gain of PI-type observer in forward estimation device,
- $\hat{}$: Estimate,
- $\tilde{}$: Error, and
- $\dot{}$: Differential value.

15. The method of claim 12, wherein the step of determining the second estimate includes determining the second estimate using wheel speed, motor torque, motor speed, vehicle load torque, transmission state information, and stored setting information.

16. The method of claim 15, wherein the step of determining the second estimate includes determining an engine clutch output shaft torque estimate using wheel acceleration obtained from the wheel speed, the vehicle load torque, and a vehicle inertia value selected among the stored setting information, and determining the second estimate using the engine clutch output shaft torque estimate, the motor torque, the motor speed, the transmission state information, and the stored setting information.

17. The method of claim 16, wherein
the transmission state information includes a gear ratio of a current transmission stage, a rotation speed of an input shaft fastened to a current transmission stage for power transmission, and a final reduction ratio depending on the fastened input shaft, and
the stored setting information for determining the second estimate includes a motor inertia value and an input shaft inertia value.

18. The method of claim 17, wherein the step of determining the second estimate includes determining the second estimate using a third equation and a fourth equation or using the third equation and a fifth equation depending on the input shaft fastened to the current transmission stage for power transmission, wherein the third equation is $$\hat{T}_o = J_v \dot{\omega}_w + T_v,$$

wherein the fourth equation is $$\hat{T}_{ec,r} = -T_m + J_m \dot{\omega}_m + J_{e1} \dot{\omega}_{c1} + \frac{\hat{T}_o}{i_{t1} i_{f1}},$$

wherein the fifth equation is $$\hat{T}_{ec,r} = -T_m + J_m \dot{\omega}_m + J_{e2} \dot{\omega}_{c2} + \frac{\hat{T}_o}{i_{t2} i_{f2}}, \text{ and}$$

wherein:
- $\hat{T}_{ec,r}$: Second estimate,
- $T_m$: Drive motor torque
- $T_o$: Output shaft torque,
- $T_v$: Vehicle load torque,
- $J_m$: Drive motor inertia value,
- $J_{e1}$: Inertia value of first input shaft of transmission,
- $J_{e2}$: Inertia value of second input shaft of transmission,
- $\omega_m$: Drive motor speed,
- $\omega_{e1}$: Speed of first input shaft of the transmission,
- $\omega_{e2}$: Speed of second input shaft of the transmission,
- $i_{t1}$ and $i_{t2}$: Gear ratios depending on fastened input shafts,
- $i_{f1}$ and $i_{f2}$: Final reduction ratios depending on the fastened input shafts,
- $\hat{\phantom{x}}$: Estimate,
- $\tilde{\phantom{x}}$: Error, and
- $\dot{\phantom{x}}$: Differential value.

19. The method of claim 12, wherein the step of determining the final estimate includes determining the final estimate of the engine clutch transfer torque from a sixth equation using the feedforward weight and the feedback weight determined by the weight determination device, wherein the sixth equation is $$\hat{T} = L_{ff} \hat{T} + L_{fb}(\hat{T}_{ec,r} - \hat{T}_{ec}), \text{ and}$$

wherein:
- $\hat{T}_{ec,f}$: First estimate,
- $\hat{T}_{ec,r}$: Second estimate,
- $L_{ff}$: Feedforward weight,
- $L_{fb}$: Feedback weight,
- $\hat{T}_{ec}$: Final estimate of engine clutch transfer torque, and
- $\dot{\hat{T}}_{ec,r}$: Differential value of second estimate.

20. The method of claim 19, wherein the step of determining the weight includes determining the feedforward weight to be 0 when at least one of the predetermined devices in the vehicle is operated and determining the feedforward weight to be a smaller value and the feedback weight to be a larger value as a value of the brake input by the driver is increased.

21. The method of claim 12, wherein the step of determining the weight includes determining the feedforward weight and the feedback weight to be applied to the first estimate and the second estimate, respectively, the feedforward weight and the feedback weight being determined from a seventh equation and an eighth equation, wherein the seventh equation is $$L_{ff} = (1 - D_B) \times D_S,$$

wherein the eighth is $$L_{fb} = (C - L_{ff}) \times K, \text{ and}$$

wherein:
- $L_{ff}$: Feedforward weight,
- $L_{fb}$: Feedback weight,
- $D_B$: Normalized disturbance value determined to be value selected from between 0 and 1 in a response to brake input by driver
- $D_S$: Value determined to be 1 when no predetermined devices in vehicle are operated and to be 0 when at least one predetermined device in vehicle is operated,
- C: Stored setting value, and
- K: Predetermined gain.

22. The method of claim 21, wherein the normalized disturbance value is set to be a larger value as a value of the brake input by the driver is increased.

\* \* \* \* \*